UNITED STATES PATENT OFFICE.

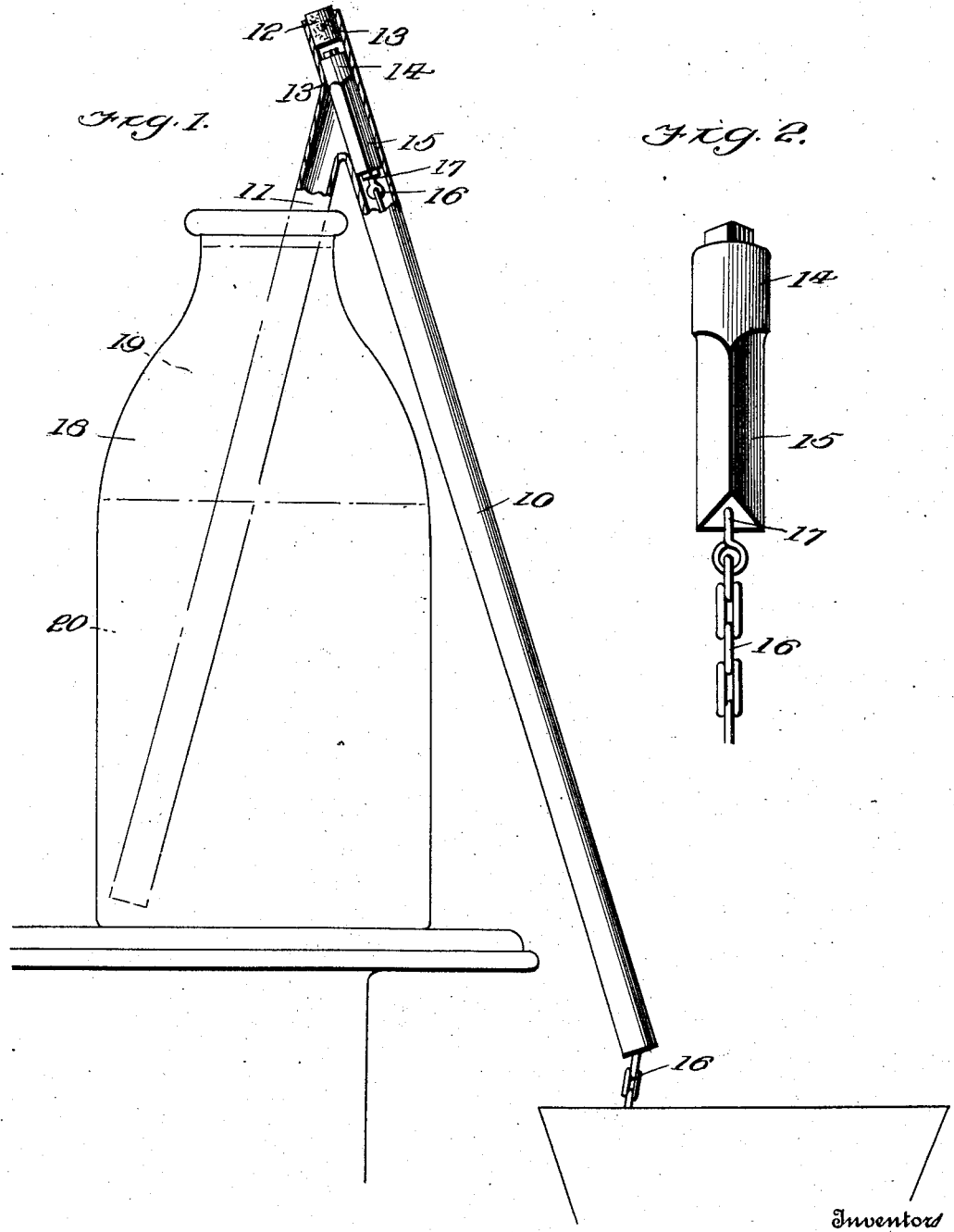

ARTHUR W. SPAULDING, OF TACOMA, WASHINGTON, AND CYRENUS K. BENDER, OF OCONOMOWOC, WISCONSIN.

CREAM-EXTRACTOR.

997,425.  Specification of Letters Patent.  Patented July 11, 1911.

Application filed December 8, 1910. Serial No. 596,385.

*To all whom it may concern:*

Be it known that we, ARTHUR W. SPAULDING and CYRENUS K. BENDER, citizens of the United States, the latter residing at Oconomowoc, in the county of Waukesha and State of Wisconsin, and the former residing at Tacoma, in the county of Pierce and State of Washington, have invented certain new and useful Improvements in Cream-Extractors, of which the following is a specification.

This invention relates to improvements in devices for extracting cream from milk or extracting milk from cream, without disturbing the milk or the cream, as the case may be.

The improved device may be employed either for extracting milk from cream or cream from milk without material structural changes, but is designed more particularly for extracting the milk from the cream, and has for one of its objects to simplify and improve the construction and increase the efficiency and utility of devices of this character.

The improved device is designed more particularly for extracting the milk from beneath the cream in the ordinary service bottles employed by milkmen when delivering the milk, and for the purpose of illustration is shown thus applied, and in the drawings thus employed to illustrate the preferred embodiment of the invention; Figure 1 is a side elevation, partly in section, of the improved device applied; Fig. 2 is an enlarged perspective view of the movable plunger, detached.

Corresponding and like parts are referred to in the following description and indicated in all the views of the drawings by the same reference characters.

The improved device comprises a longer tubular arm 10 and a shorter tubular arm 11, with the shorter arm connected to the longer arm a short distance below its upper end 12, as shown at 13. By this means the communication between the two arms is located below the upper end 12 leaving a considerable portion of the longer arm 10 projecting above the upper line of the shorter arm 11. A detachable closure 13 is insertible into the open upper end 12 of the longer arm 10, but does not project into the member 10 as far as the opening into the shorter arm 11, as shown. Slidably disposed in the longer arm 10 is a plunger 14, of any suitable material, such as cork or the like, and depending from the lower end of the plunger is a projecting portion 15 having the sides cut away to form passages for the air, as hereafter explained.

Connected to the plunger member 14—15 is a pulling member, preferably in the form of a light chain 16, which is long enough to extend through the whole length of the longer member 10 with a portion projecting beyond the lower open end when the plunger is in its highest position or next to the closure 13. The flexible member 16 may be connected in any suitable manner to the plunger, but will preferably be attached to a rod 17 which passes entirely through the plunger and is retained by nuts or other fastening devices at the ends.

With a device thus constructed, the operation is as follows: The chain 16 is threaded through the longer arm 10 from the upper end 12 and the plunger 14—15 forced into the member 10 with the reduced portion 15 opposite the opening in the shorter member 11. The plug 12 is then inserted and the projecting portion of the chain 16 permitted to run into the lower end of the member 10 so that the finger or thumb of the operator may be placed over the lower end of the member 10 to shut off the air. The shorter arm 11 is then passed slowly downward through the cream, indicated at 19, in the bottle 18 and into the milk portion, indicated at 20, care being taken not to disturb the cream. The finger is then removed from the open lower end of the longer arm 10 allowing the air to escape and permit the liquid 20 to rise into the tube 11. The operator then draws the chain 16 downwardly and moves the plunger with a slow steady motion until it is entirely removed from the member 16, this action of the plunger creating a sufficient vacuum to cause the liquid 20 to rise in the shorter arm 11 and overflow into the longer arm 10, thus starting the siphon action, as will be obvious, and the liquid will continue to flow.

The operator notes the progress of the flow until the thinner liquid 20 has been entirely removed leaving the cream 19 only within the bottle and when this time arrives the closure 12 is removed to admit air and stop the flow.

If it is desired to remove the cream from the milk the operation is the same except that the lower end of the shorter arm 11 is inserted into the receptacle 18 only far enough to locate the lower end of the member 11 just above the division line between the cream 19 and the milk 20, and operating the device in the same manner, care being taken to keep the lower open end of the arm 11 entirely within the cream portion of the contents of the receptacle until the cream is all removed.

If it is desired to employ the improved device for removing cream only a special size of the implement may be constructed with the arms shorter, but the construction will be substantially the same, and this modification would not be a departure from the spirit of the invention, and would not require any structural changes.

The improved device is simple in construction, can be inexpensively manufactured of any suitable material and of any suitable size. All of the parts being detachable the implement can readily be cleansed and scalded, or otherwise treated to maintain it in sanitary condition.

Having thus described the invention, what is claimed as new is:

A cream extractor including a longer tubular arm of a uniform bore throughout and open at both ends, a shorter tubular arm leading from the longer arm and spaced from its upper end, a plunger operating in the longer arm and including an upper portion completely filling the longer tube and a lower portion with longitudinal recesses providing air passages, said upper portion being movable into position above the opening into the shorter arm, a detachable closure for the upper end of the longer arm, a flexible member connected to said plunger and extending through the longer tubular arm and adapted to move the plunger through the same.

In testimony whereof, we affix our signatures in presence of two witnesses.

ARTHUR W. SPAULDING. [L. S.]
CYRENUS K. BENDER. [L. S.]

Witnesses as to Arthur W. Spaulding:
E. L. WILCOX,
T. S. FRETZ.

Witnesses as to Cyrenus K. Bender:
GEO. E. ROBINSON,
F. A. BUSHMAN.

Copies of this patent may be obtained for five cents each, by addressing the "Commissioner of Patents, Washington, D. C."